(12) United States Patent
Cocchi et al.

(10) Patent No.: US 10,015,976 B2
(45) Date of Patent: Jul. 10, 2018

(54) ICE CREAM MACHINE

(75) Inventors: Andrea Cocchi, Calderara Di Reno (IT); Roberto Lazzarini, Reggio Emilia (IT)

(73) Assignee: ALI S.p.A—CARPIGIANI GROUP, Milan (IT)

( * ) Notice: Subject to any disclaimer, the term of this patent is extended or adjusted under 35 U.S.C. 154(b) by 0 days.

(21) Appl. No.: 13/547,627

(22) Filed: Jul. 12, 2012

(65) Prior Publication Data

US 2013/0014650 A1    Jan. 17, 2013

(30) Foreign Application Priority Data

Jul. 14, 2011    (IT) ................. MI2011A1313

(51) Int. Cl.
*A23G 9/04*     (2006.01)
*A23G 9/22*     (2006.01)

(52) U.S. Cl.
CPC .................... *A23G 9/228* (2013.01)

(58) Field of Classification Search
CPC ........ A23G 9/228; A23G 9/045; G01N 27/02; G01N 33/02
USPC ........ 99/455, 453, 466, 485; 62/1, 135–137, 62/139
See application file for complete search history.

(56) References Cited

U.S. PATENT DOCUMENTS

| | | | |
|---|---|---|---|
| 1,449,458 A * | 3/1923 | Sutermeister | 62/69 |
| 3,811,494 A * | 5/1974 | Menzel | 165/65 |
| RE29,837 E * | 11/1978 | Moore | 219/710 |
| 4,219,776 A * | 8/1980 | Arulanandan | 324/323 |
| 4,417,671 A * | 11/1983 | Kawasaki et al. | 222/56 |
| 4,881,025 A * | 11/1989 | Gregory | 324/672 |
| 5,095,710 A * | 3/1992 | Black et al. | 62/68 |
| 5,103,181 A * | 4/1992 | Gaisford et al. | 324/637 |
| 5,158,506 A | 10/1992 | Kusano et al. | |
| 5,189,366 A * | 2/1993 | Mayo | 324/233 |
| 5,493,922 A * | 2/1996 | Ramey et al. | 73/863.02 |
| 5,749,986 A * | 5/1998 | Wyatt | 156/64 |
| 6,274,850 B1 * | 8/2001 | Mercer | A47J 37/1266 219/441 |
| 6,507,662 B1 * | 1/2003 | Brooks | 382/115 |
| 6,653,842 B2 * | 11/2003 | Mosley et al. | 324/446 |

(Continued)

FOREIGN PATENT DOCUMENTS

| | | | | |
|---|---|---|---|---|
| EP | 1618794 | | 1/2006 | |
| EP | 2500724 A1 * | | 9/2012 | G01N 33/10 |
| WO | WO 2011032623 A1 * | | 3/2011 | G01N 27/02 |

OTHER PUBLICATIONS

Italian Search Report dated Feb. 27, 2012 from counterpart application.

(Continued)

*Primary Examiner* — Dana Ross
*Assistant Examiner* — Lawrence Samuels
(74) *Attorney, Agent, or Firm* — Shuttleworth & Ingersoll, PLC; Timothy J. Klima

(57) ABSTRACT

The invention describes a machine for making ice-cream which comprises a holding tank and a cooling and/or heating circuit for a liquid or semi-liquid foodstuff to be treated, a detection apparatus capable of detecting a characteristic parameter of this product, and a control unit capable of recognizing the product starting from this parameter, and for setting operating parameters for the machine on the basis of the product recognized.

12 Claims, 16 Drawing Sheets

(56) References Cited

U.S. PATENT DOCUMENTS

| | | | |
|---|---|---|---|
| 6,705,106 B1 * | 3/2004 | Cunha et al. | 62/342 |
| 7,275,863 B1 * | 10/2007 | Akers et al. | 374/102 |
| 7,350,403 B2 * | 4/2008 | Yakhno et al. | 73/64.53 |
| 7,493,802 B2 * | 2/2009 | Kawanishi et al. | 73/61.76 |
| 7,933,733 B2 * | 4/2011 | Ashrafzadeh et al. | 702/116 |
| 8,758,678 B2 * | 6/2014 | Cocchi et al. | 422/3 |
| 2002/0043071 A1 | 4/2002 | Frank et al. | |
| 2003/0132755 A1 * | 7/2003 | Feng et al. | 324/438 |
| 2003/0206021 A1 * | 11/2003 | Laletin | G01R 31/3631 324/426 |
| 2006/0174775 A1 * | 8/2006 | Yitzchak et al. | 99/358 |
| 2007/0098857 A1 * | 5/2007 | Kohlstrung | 426/233 |
| 2007/0100387 A1 * | 5/2007 | Gerber | 607/41 |
| 2007/0214872 A1 * | 9/2007 | Ammann et al. | 73/53.01 |
| 2008/0029541 A1 | 2/2008 | Wallace et al. | |
| 2008/0226779 A1 * | 9/2008 | Cocchi et al. | 426/231 |
| 2008/0302818 A1 * | 12/2008 | Minard et al. | 222/1 |
| 2009/0132174 A1 * | 5/2009 | Burke | A22C 29/005 702/19 |
| 2009/0191318 A1 * | 7/2009 | Cocchi et al. | 426/231 |
| 2009/0193828 A1 * | 8/2009 | Cocchi et al. | 62/222 |
| 2009/0236335 A1 * | 9/2009 | Ben-Shmuel et al. | 219/710 |
| 2009/0295659 A1 * | 12/2009 | Blumberg, Jr. | 343/749 |
| 2010/0031825 A1 * | 2/2010 | Kemp | 99/275 |
| 2010/0086655 A1 * | 4/2010 | Singer | G01N 33/02 426/232 |
| 2010/0182021 A1 * | 7/2010 | Singer | A61B 5/0537 324/692 |
| 2011/0020508 A1 * | 1/2011 | Santoiemmo | 426/232 |
| 2012/0169354 A1 * | 7/2012 | Erbe et al. | 324/649 |
| 2012/0169468 A1 * | 7/2012 | Butler et al. | 340/10.1 |
| 2012/0237644 A1 * | 9/2012 | Luckhardt | G01N 33/10 426/231 |

OTHER PUBLICATIONS

European Search Report dated Apr. 23, 2014 from counterpart App No. 12176173.8.

* cited by examiner

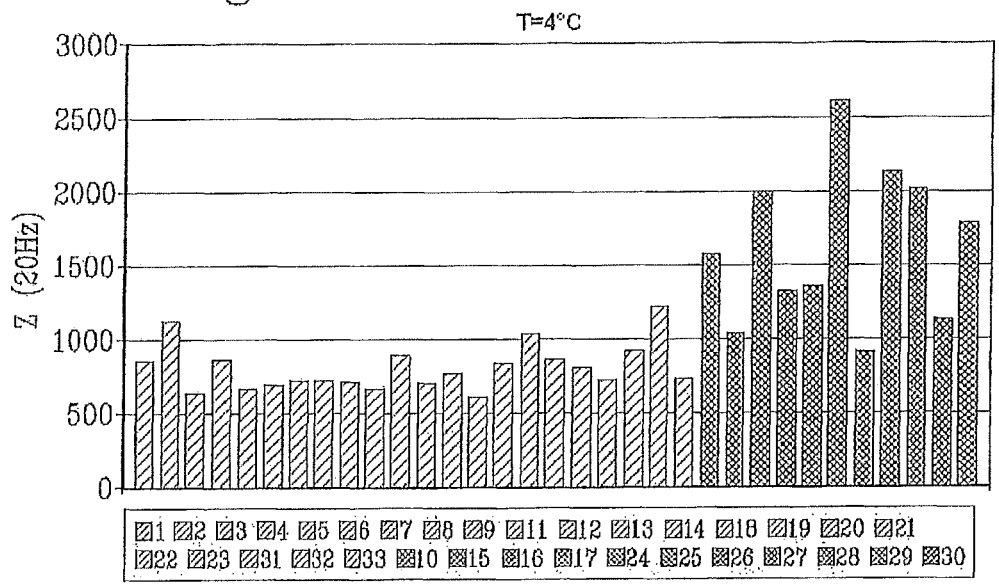
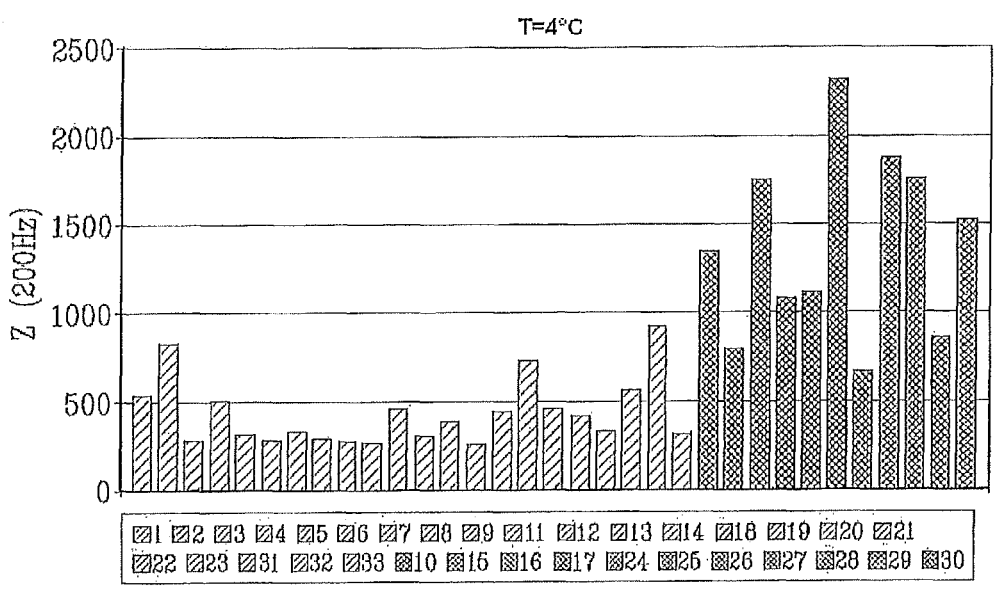

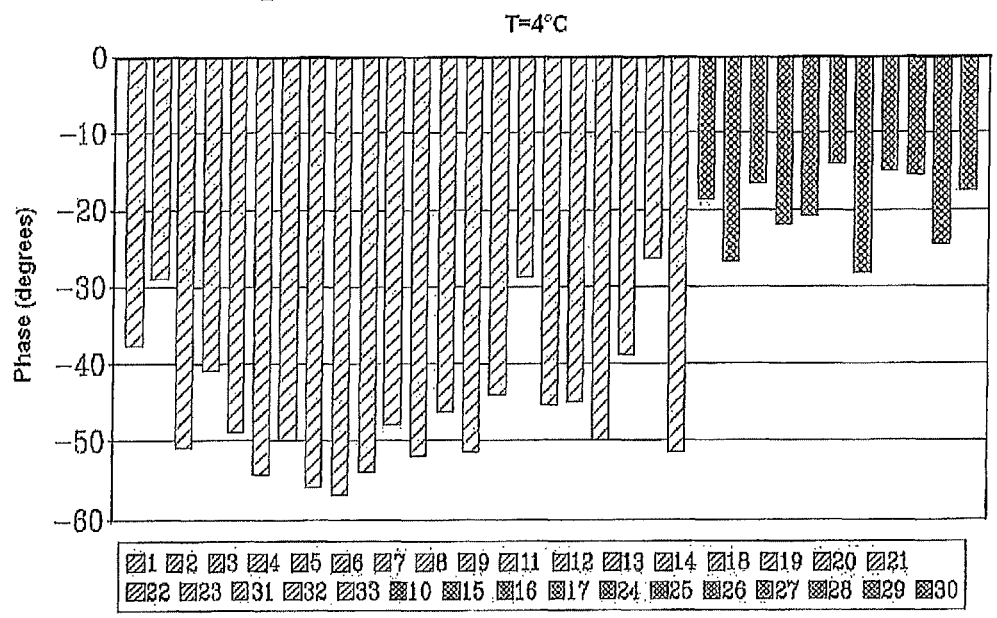
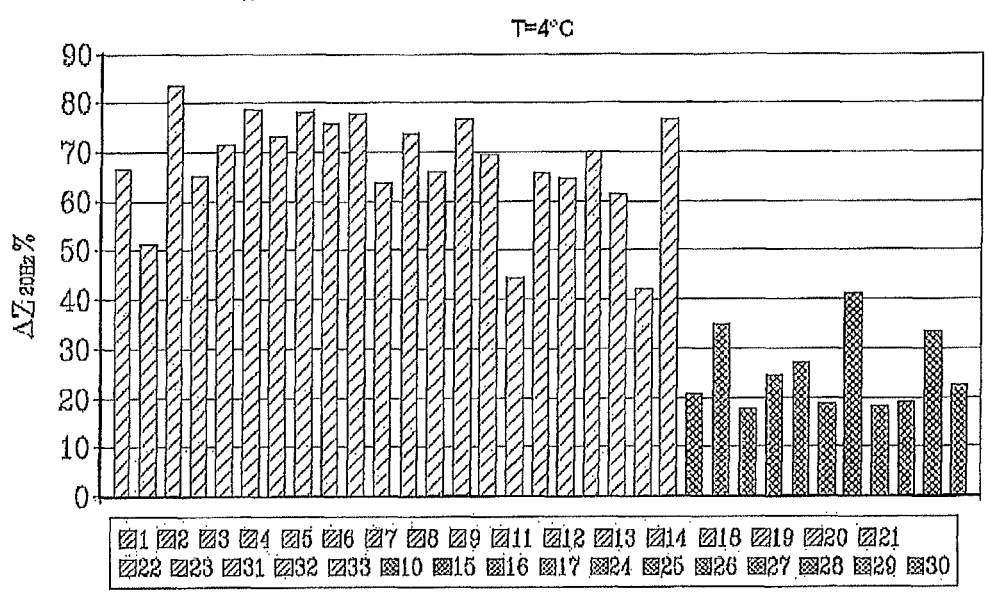

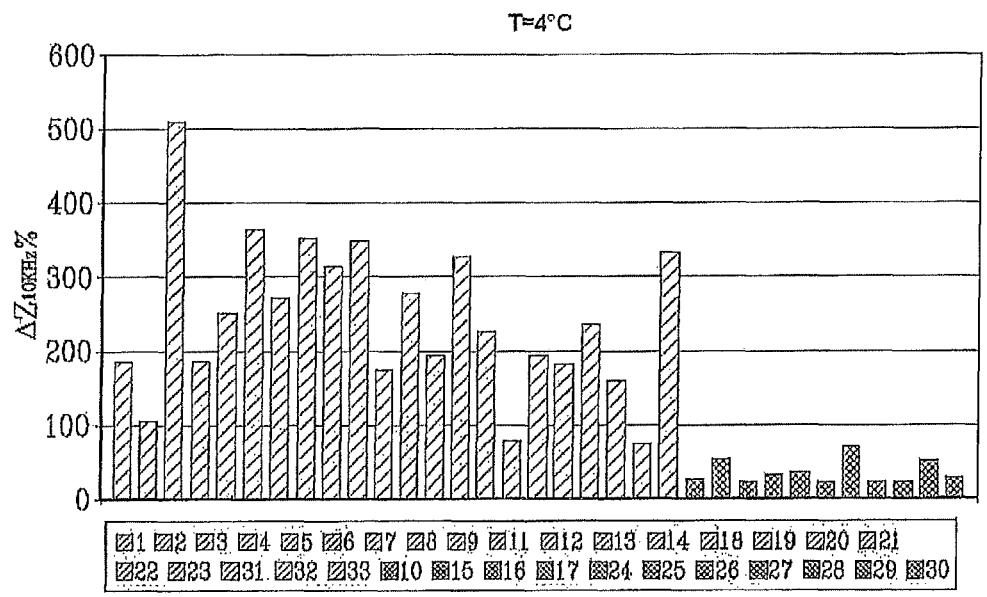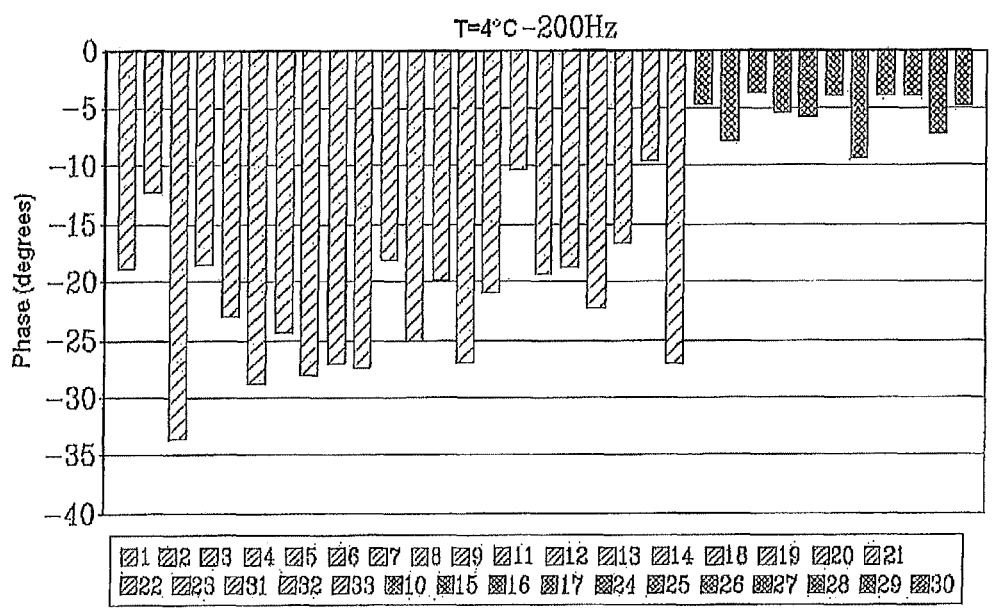

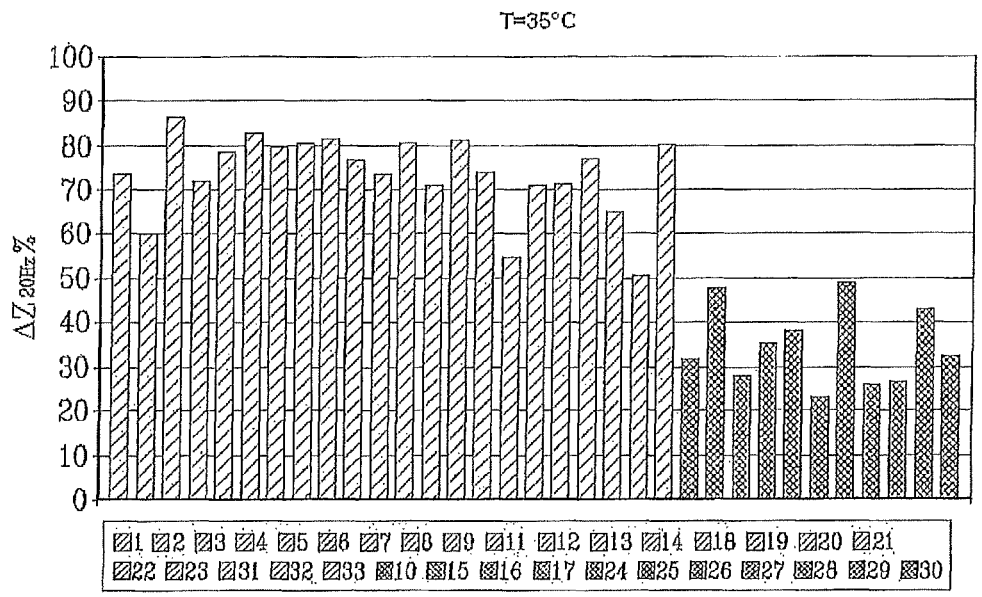
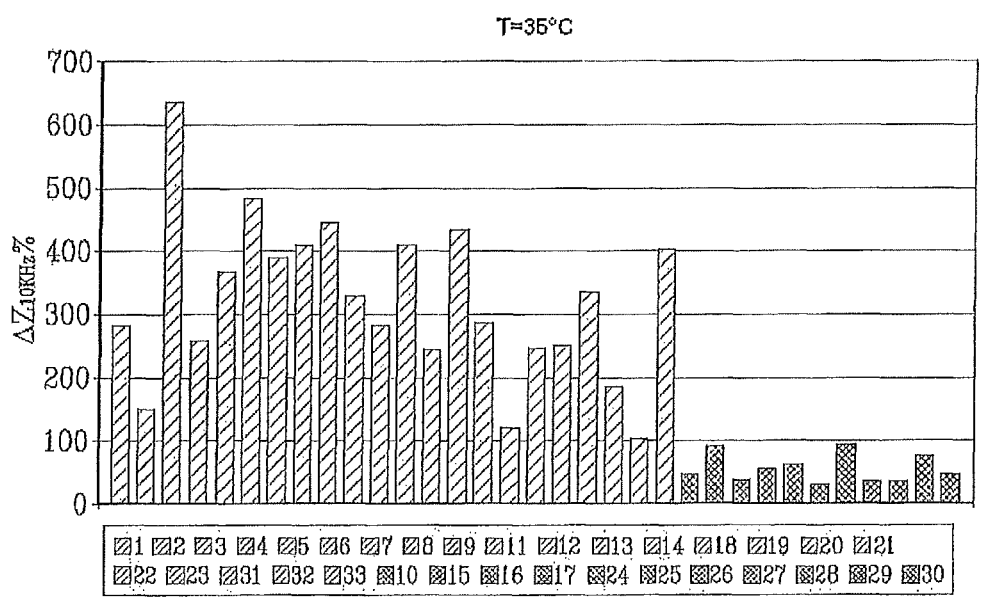

ICE CREAM MACHINE

This application claims priority to Italian Patent Application MI2011A001313 filed Jul. 14, 2011, the entirety of which is incorporated by reference herein.

FIELD OF APPLICATION

The subject of the present invention is an ice-cream machine.

KNOWN ART

Machines or processing plants for foodstuffs (e.g. machines for ice-cream, granita etc.) known in the current state of the art require adjustments and settings depending on the characteristics of the mix to be treated; currently, the adjustments are decided and effected manually by technical personnel.

This brings about an inevitable slowing in the production cycle, as well as potential risks of configuration errors.

One consequence can be unsuitable mixing of the liquid, which results in preparation of a product of non-optimal quality.

The general object of the present invention is to provide an ice-cream machine capable of resolving the problems described.

An object of the present invention is to provide an ice-cream machine capable of reducing preparation times by comparison with the known art.

Another object is to provide an ice-cream machine capable of correctly recognizing the mix to be treated.

An additional object is to provide an ice-cream machine capable of rapidly recognizing the mix to be treated, before the mix is introduced into the machine.

A further additional object is to provide an ice-cream machine capable of rapidly recognizing the mix to be treated, after the mix is introduced into the machine.

A particular object is to provide an ice-cream machine capable of rapidly recognizing the mix to be treated.

A further object is to provide an ice-cream machine capable of consistently recognizing errors in programming the machine once the mix to be treated has been recognized.

SUMMARY OF THE INVENTION

These and other objects are achieved by an ice-cream making machine according to the description given in the attached claims.

The machine according to the invention achieves the following principal technical effects:
  reduced recognition times for the mix to be treated;
  reduced preparation times:
  minimised probability of error in recognizing the mix:
  minimised probability of error in configuring the machine for successive operations of preparing ice-cream.

These and other technical effects of the invention will appear in more detail from the description which follows, of examples of embodiment, given by way of indication with reference to the attached drawings.

The groups of FIGS. 4 to 6 show variations of a characteristic electrical parameter in a first condition of detection in accordance with the first embodiment of the invention.

The groups of FIGS. 7 and 8 show variations of a characteristic electrical parameter in a second condition of detection in accordance with the first embodiment of the invention.

The group of FIG. 9 shows variations of a characteristic electrical parameter of a first type of ice-cream mix in accordance with the first embodiment of the invention.

The group of FIG. 10 shows variations of a characteristic electrical parameter of a second type of ice-cream mix in accordance with the first embodiment of the invention.

Figures 11A, 11B:

FIG. 11*a* shows a first primary storage module of the machine processing unit, according to the first embodiment of the invention.

FIG. 11*b* shows a first secondary storage module of the machine processing unit, according to the first embodiment of the invention.

Figures 12A, 12B:

FIG. 12*a* shows a second primary storage module of the machine processing unit, in accordance with the second embodiment of the invention FIG. 12*b* shows a second secondary storage module of the machine processing unit, in accordance with the second embodiment of the invention

DETAILED DESCRIPTION

An ice-cream machine according to the invention comprises a holding tank and a cooling and/or heating circuit for a liquid or semi-liquid foodstuff to be treated, a detection apparatus capable of detecting a characteristic parameter of this product, and a control unit capable of recognizing the product starting from this parameter, and for setting operating parameters for the machine on the basis of the product recognized.

Figure 1:
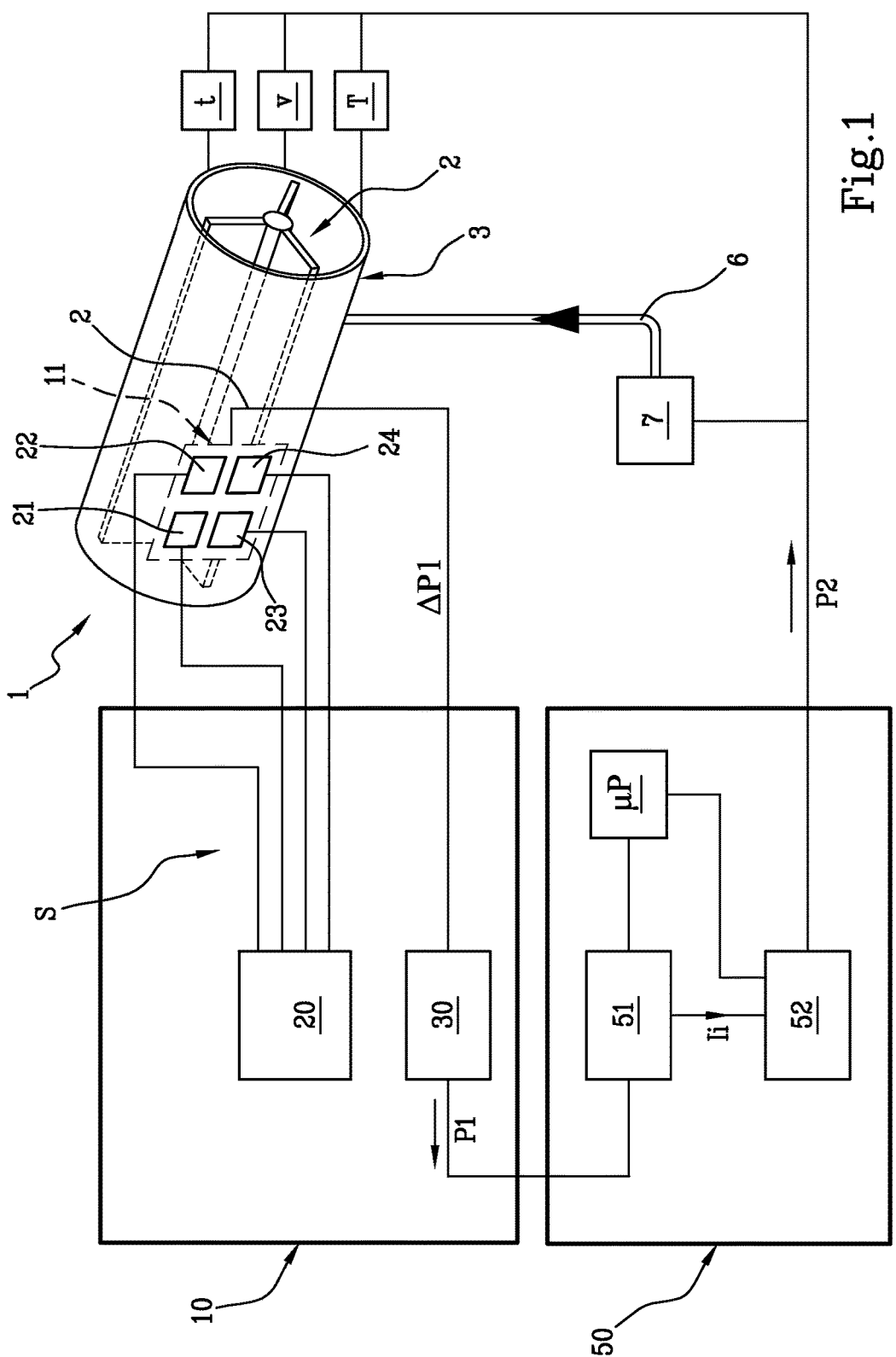
FIG. 1 is a block diagram of an overall view of the ice-cream machine in a first embodiment of the invention.

With reference to FIG. 1, an ice-cream machine, 1, 1*b* according to the invention comprises a holding tank 3, also called a churning chamber, which contains a liquid or semi-liquid foodstuff 2 constituting the ice-cream base mix.

Machine 1 also comprises a cooling and/or heating circuit 6 for the liquid or semi-liquid foodstuff 2.

The circuit 6 comprises, in its turn, a compressor 7 capable of varying the thermal power of said machine 1,1*b*.

Hereinafter, the expressions "liquid or semi-liquid foodstuff" and "mix" will be used interchangeably, meaning thereby the basic product which the machine 1, 1*b* is capable of treating to produce ice-cream.

The mix can have various compositions and/or densities.

In general the mixes for ice-cream can be classified into two broad categories:
  fruit-based mixes;
  cream-based mixes.

The two categories are identified with fairly definite pH values; fruit-based mixes generally have pH values<5, while cream-based mixes generally have pH values>5.8.

As is well-known to persons skilled in the art, fruit-based mixes comprise ingredients which distinguish them from those with a cream base and which, consequently, give rise to their different pH values.

For completeness, a table is shown below of the characteristics of various mixes of liquid or semi-liquid products, in particular ice-cream mixes.

The table shows information relating to type of mix, composition of mix, method of preparation, characteristic notes and pH value.

Fruit-based mixes are shown in italics, while cream-based mixes are shown in standard type.

The left-hand column shows an identifying value for the mix described, which will be used below to briefly indicate this mix.

| Ii | Designation of mix | Composition | Preparation method | Notes | pH |
|---|---|---|---|---|---|
| 1 | Low-fat soft | Water, skimmed milk powder, cream, base 100 and sugar with the following percentages: sugars 11.9%, fats 4%, non-fat milk solids 8.9%, stabilisers 0.3% | hot preparation with high pasteurisation cycle and 13 hour maturation time | Mix prepared by batching each ingredient to be sure of the exact percentage. Assumed to be a lower limit low-fat mix in percentage of fats | 6.2 |
| 2 | Full-fat soft | Water, skimmed milk powder, cream, base 100 and sugar with the following percentages: sugars 17.2%, fats 11.2%, non-fat milk solids 12%, stabilisers 0.3% | hot preparation with high pasteurisation cycle and taken for use without maturation | Mix prepared by batching each ingredient to be sure of the exact percentage. Assumed to be a higher limit full-fat mix in percentage of fats | 6.0 |
| 3 | Friso | Skimmed milk, cream (26.7%), sugar, maltodextrin, milk components, stabilisers (E460, E466, E412), carrageenans, E331, emulsifier (E471), flavouring, salt. | Taken from the bag at room temperature (20° C.) | 10% mixture of fats | 6.6 |
| 4 | Fiordilatte Elena Soft | Pasteurised whole milk (60%), cream, sugar, glucose-fructose syrup, dextrose, skimmed milk powder, milk protein, emulsifiers (mono- and diglycerides of fatty acids), densifiers (sodium alginate, carob seed flour). | Taken from the bag at room temperature (20° C.) | Long conservation uht preparation for ice-cream | 6.42 |
| 5 | Fiordilatte soft Pregel + non-drinking water | Sugar, skimmed milk powder, hydrogenated vegetable fats, dextrose, dehydrated glucose syrup, densifiers (E412, E410, E466), emulsifiers (E471, E472a, E472b), acidifier (E330), flavourings. | 1 l of non-drinking water at room temperature (20° C.) is poured into a container together with 400 g of powder, after which all ingredients are mixed by mixer. | The ingredients refer to the composition of fiordilatte soft powder | 6.74 |
| 6 | Fiordilatte soft Pregel + whole milk | Sugar, skimmed milk powder, hydrogenated vegetable fats, dextrose, dehydrated glucose syrup, densifiers (E412, E410, E466), emulsifiers (E471, E472a, E472b), acidifier (E330), flavourings. | 1 l of whole milk at room temperature (20° C.) is poured into a container together with 400 g of powder, after which all ingredients are mixed by mixer. | The ingredients refer to the composition of fiordilatte soft powder | 6.5 |

-continued

| Ii | Designation of mix | Composition | Preparation method | Notes | pH |
|---|---|---|---|---|---|
| 7 | Fiordilatte soft Pregel + drinking water | Sugar, skimmed milk powder, hydrogenated vegetable fats, dextrose, dehydrated glucose syrup, densifiers (E412, E410, E466), emulsifiers (E471, E472a, E472b), acidifier (E330), flavourings. | 1 l of drinking water at room temperature (20° C.) is poured into a container together with 400 g of powder, after which all ingredients are mixed by mixer. | The ingredients refer to the composition of fiordilatte soft powder | 7 |
| 8 | Chocolate soft Pregel + drinking water | Sugar, cocoa, skimmed milk powder, hydrogenated vegetable fats, dextrose, dehydrated glucose syrup, densifiers (E412, E410, E466), emulsifiers (E471, E472a, E472b), acidifier (E330). | 1 l of drinking water at room temperature (20° C.) is poured into a container together with 400 g of powder, after which all ingredients are mixed by mixer. | The ingredients refer to the composition of chocolate soft powder | 7.1 |
| 9 | Chocolate soft Pregel + whole milk | Sugar, cocoa, skimmed milk powder, hydrogenated vegetable fats, dextrose, dehydrated glucose syrup, densifiers (E412, E410, E466), emulsifiers (E471, E472a, E472b), acidifier (E330). | 1 l of whole milk at room temperature (20° C.) is poured into a container together with 400 g of powder, after which all ingredients are mixed by mixer. | The ingredients refer to the composition of chocolate soft powder | 6.7 |
| 10 | Lemon 50 Pregel | Sugar, skimmed milk powder, dextrose, densifiers (E412, E466), emulsifiers (E471, E472b, E477), acidifier (E330), lemon juice, flavourings. | 1 l of drinking water at room temperature (20° C.) is poured into a container together with 400 g of sugar and 50 g of powder, after which all ingredients are mixed by mixer. | The ingredients refer to the composition of 50 lemon powder to which I have added sugar which is introduced at the mixing stage | 2.35 |
| 11 | Friso pasteurised | Skimmed milk, cream (26.7%), sugar, maltodextrin, milk components, stabilisers (E460, E466, E412), carrageenans, E331, emulsifier (E471), flavourings, salt. | Taken from the bag at room temperature (20° C.) | 10% mixture of fats | 6.6 |
| 12 | Cream base | 66.5% whole milk, 8% skimmed milk powder, 4.2% fresh cream 35%, 15.6% saccharose, 2% dextrose, 7.5% egg yolks, 3.4% base 50 | | | 6.61 |
| 13 | Chocolate base | 63% whole milk, 10% fresh cream 35%, 15.6% saccharose, 2% dextrose, 6% cocoa powder (22-24% bc), 3.4% base 50 | | | 7.04 |
| 14 | White base | 70% whole milk, 1.3% skimmed milk powder, 8.2% fresh cream 35%, 15.4% saccharose, 1.7% dextrose, 3.4% base 50 | | | 6.6 |
| 15 | Kiwi | Pulp/juice, water, base 50F, saccharose with the following percentages: 50% pulp/juice, 23.1% water, 24.9% saccharose, 2% base 50F, 1.5% lemon juice | | | 3.5 |

-continued

| Ii | Designation of mix | Composition | Preparation method | Notes | pH |
|---|---|---|---|---|---|
| 16 | Pineapple | Pulp/juice, water, base 50F, saccharose with the following percentages: 50% pulp/juice, 24.6% water, 23.4% saccharose, 2% base 50F, 1.5% lemon juice | | | 3.78 |
| 17 | Water base lemon | 2% lemon juice, 50.5% water, 25.75% saccharose, 3.75% fruit base 50 | | | 2.75 |
| 18 | Friso 5% | Skimmed milk, cream (11.6%), sugar, maltodextrin, milk components, stabilisers (E460, E466, E331 E412), carrageenans, E331, emulsifier (E471), vanilla flavouring, salt. | Taken from the bag at room temperature (20° C.) | 5% mixture of fats | 6.39 |
| 19 | Fiordilatte white base | 65.5% milk, 2.09% skimmed milk powder, 12.4% cream, 14.45% sugar, 5.06% dextrose, 0.5% stabilisers | | | 6.51 |
| 20 | Full-fat soft | Water, skimmed milk powder, cream, base 100 and sugar with the following percentages: sugars 17.2%, fats 11.2%, non-fat milk solids 12%, stabilisers 0.3% | Preparation with pasteurisation cycle at 65° C. | | 6.32 |
| 21 | Cream base | 66.5% whole milk, 8% skimmed milk powder, 4.2% fresh cream 35%, 15.6% saccharose, 2% dextrose, 7.5% egg yolks, 3.4% base 50 | | | 6.61 |
| 22 | White base | 70% whole milk, 1.3% skimmed milk powder, 8.2% fresh cream 35%, 15.4% saccharose, 1.7% dextrose, 3.4% base 50 | | | 6.6 |
| 23 | Chocolate base | 63% whole milk, 10% fresh cream 35%, 15.6% saccharose, 2% dextrose, 6% cocoa powder (22-24% bc), 3.4% base 50 | | | 7.04 |
| 24 | Orange | Orange 70% water 4.9%, sugar 20.8%, fruit Base 50 3.5%, lemon juice 1.5% | | | 3.47 |
| 25 | Prickly pear | Prickly pear 50%, water 25.5%, sugar 22%, fruit Base 50 2.5%, lemon juice 1.5% | | | 6.25 |
| 26 | Banana | Banana 50%, water 27.6%, sugar 20.4%, fruit Base 50 2%, lemon juice 1.5% | | | 4.81 |
| 27 | Strawberry | Strawberry 50%, water 23.5%, sugar 24%, fruit Base 50 2.5%, lemon juice 1.5% | | | 3.6 |
| 28 | Pear | Pear 50%, water 25%, sugar 22.5%, fruit Base 50 2.5%, lemon juice 1.5% | | | 4.54 |
| 29 | Kibana | Kiwi 35%, banana 15%, water 24.9%, sugar 23%, fruit Base 50 2.1%, lemon juice 1.5% | | | 3.78 |

-continued

| Ii | Designation of mix | Composition | Preparation method | Notes | pH |
|---|---|---|---|---|---|
| 30 | Lemon | Lemon %, water 4.9%, sugar 20.8%, fruit Base 50 3.5%, lemon juice 1.5% | | | 2.75 |
| 31 | Low-fat soft | Water, skimmed milk powder, cream, base 100 and sugar with the following percentages: sugars 11.9%, fats 4%, non-fat milk solids 8.9%, stabilisers 0.3% | | | |
| 32 | Full-fat soft | Water, skimmed milk powder, cream, base 100 and sugar with the following percentages: sugars 17.2%, fats 11.2%, non-fat milk solids 12%, stabilisers 0.3% | | | |
| 33 | Fabbri Chocolate | Sugar, cocoa powder, whole milk powder, skimmed milk powder, maltodextrin, stabilisers E412, E466, emulsifier E471, flavourings. 2.25 litres of water per 1 kg of powder. | | | |

Figure 3:
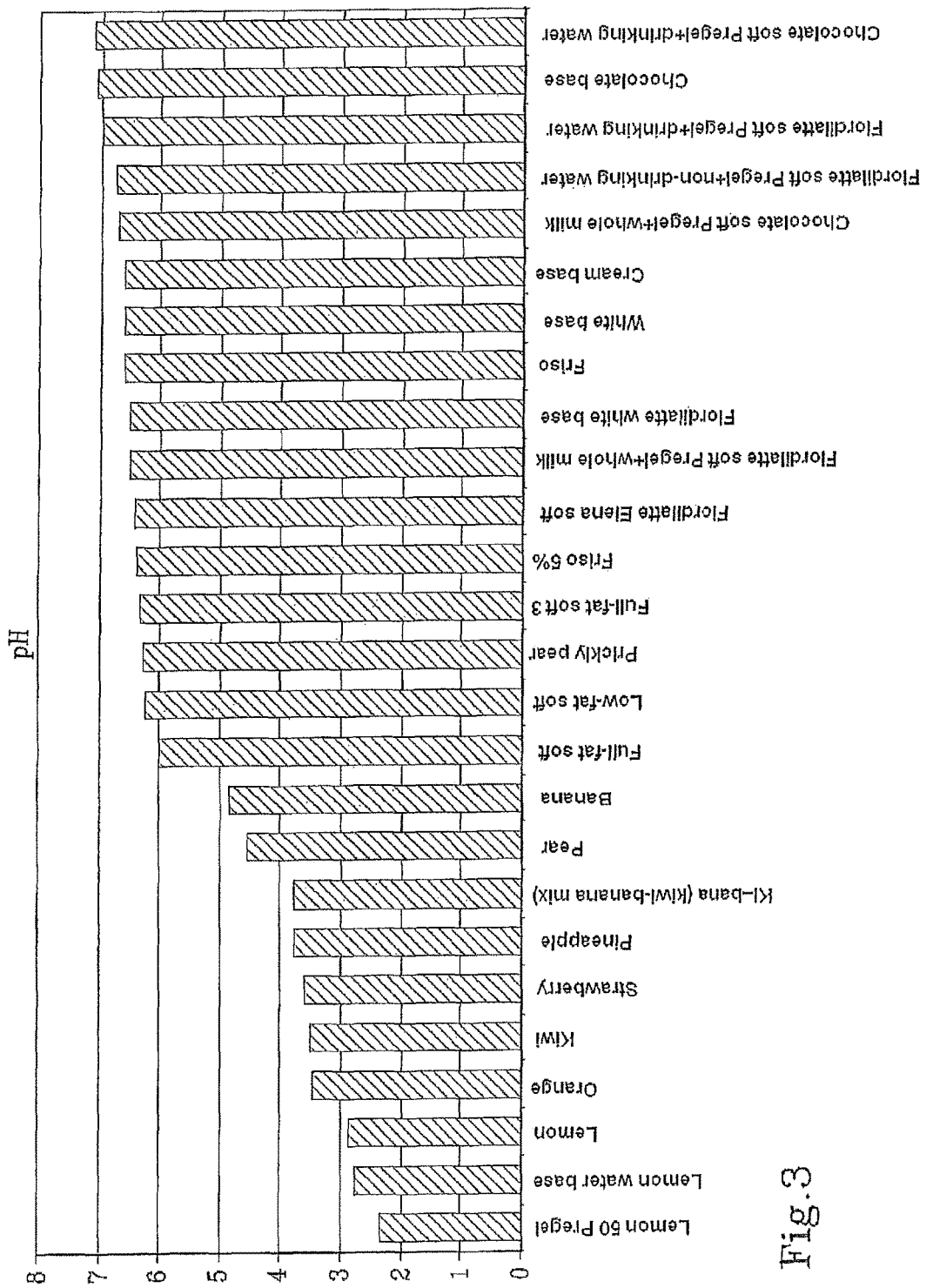
FIG. 3 shows a diagram of correspondence between pH and type of mix to be treated in accordance with the first embodiment of the invention.

FIG. 3 shows in a bar diagram the mixes to which the table refers, ordered by increasing pH value.

The ice-cream machine 1 is configured on the basis of the composition of the mix and, in the first instance, of belonging to one of two macro-categories, fruit base or cream base.

To this end, the ice-cream machine 1, according to a first embodiment of the invention (FIG. 1), comprises a first detection apparatus 10 capable of detecting an electrical parameter P1 characteristic of the liquid or semi-liquid foodstuff 2.

Figure 1B:
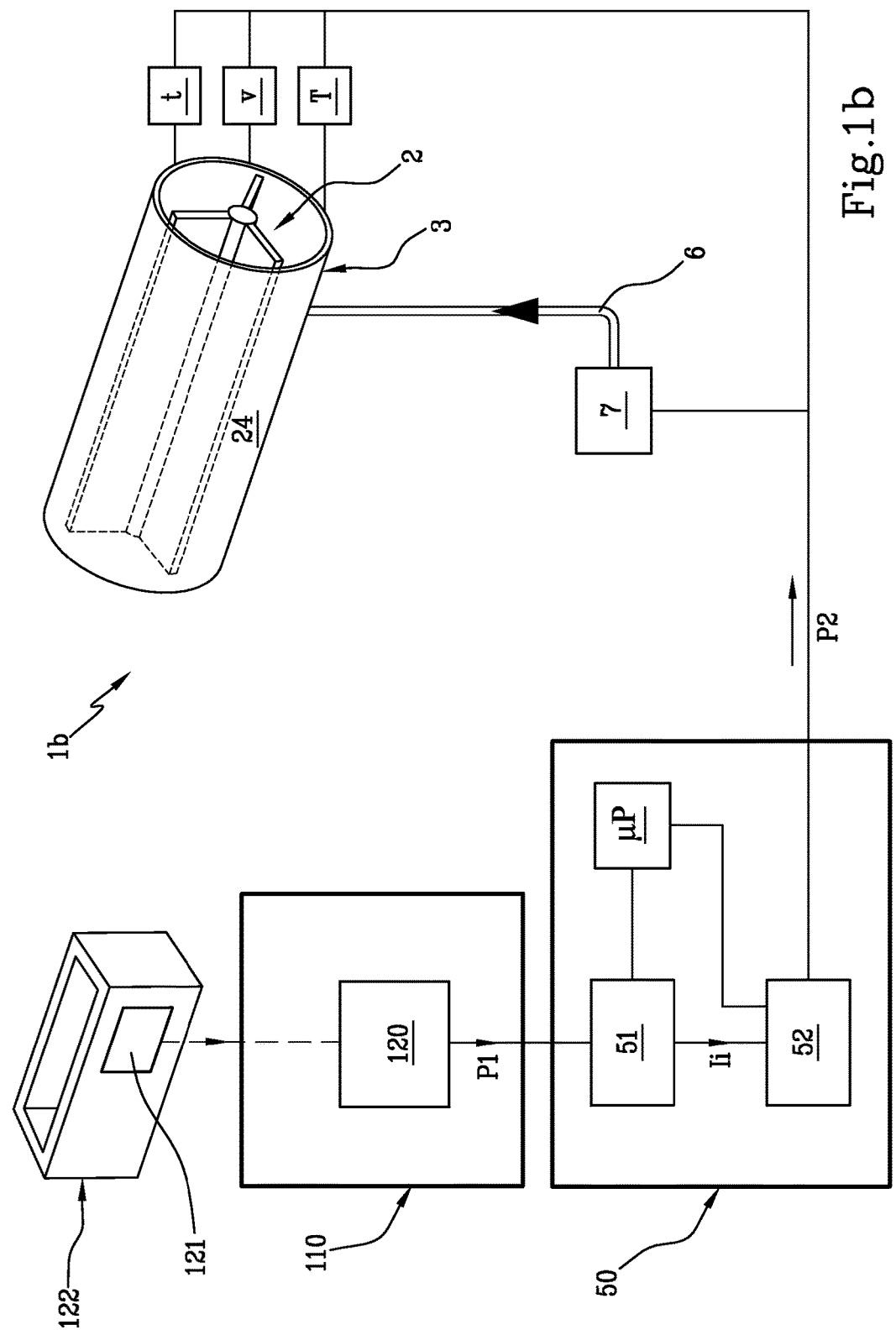
FIG. 1*b* is a block diagram of an overall view of the ice-cream machine in a second embodiment of the invention.

In particular, the first detection apparatus 10 comprises a sensor 11 capable of detecting a variation (ΔP1) of the characteristic electrical parameter P1. Alternatively, in a second embodiment of the invention (FIG. 1b), the ice-cream machine 1b comprises a second detection apparatus 110 capable of detecting the parameter P1 characteristic of the liquid or semi-liquid foodstuff 2.

According to this embodiment, the second detection apparatus 110 comprises an RFID reader 120 and said parameter P1 comprises an RFID tag 121.

According to the invention the RFID tag 121 is associated with a storage container 122 for the liquid or semi-liquid foodstuff 2.

In other words, the mix is identified before it is introduced into the ice-cream machine, when it is still in the holding container 122.

Preferably, the holding containers are containers of the bag-in-box type, or rigid containers specially made for the containment of liquid or semi-liquid foodstuffs.

In both embodiments of the invention, determining a value for the parameter P1 makes it possible to categorise the mix into one of two macro-categories, fruit base or cream base, and/or to determine further organoleptic categories of the mix.

Figure 2:
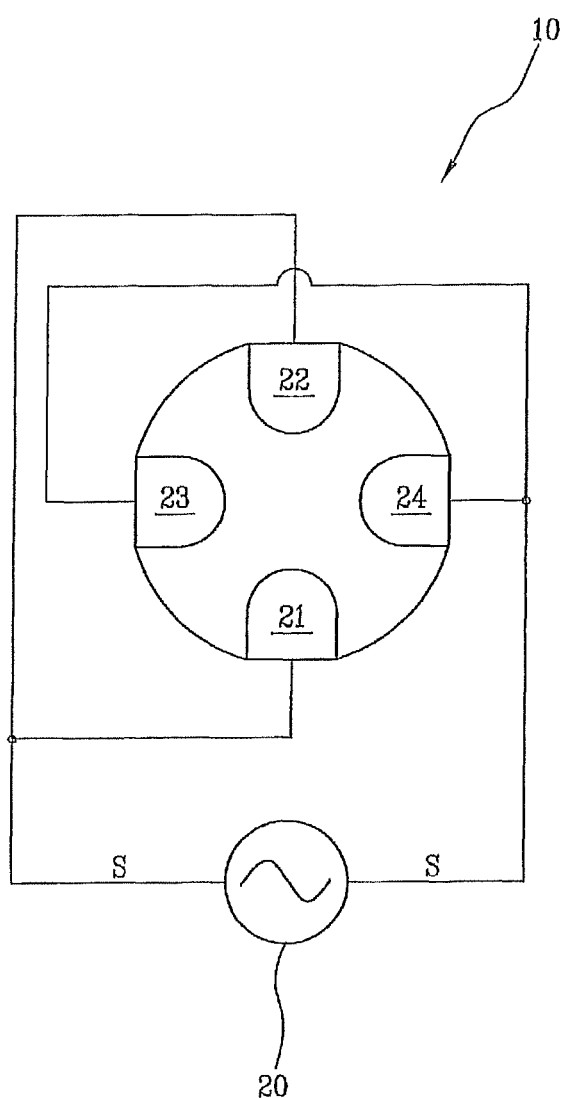
FIG. 2 is a diagram of a sensor on the machine in accordance with the first embodiment of the invention.

In accordance with the first embodiment of the invention, as shown in FIGS. 1 and 2, the sensor 11 comprises at least one pair of electrodes 21,22 and 23,24, capable of contacting the liquid or semi-liquid foodstuff 2.

In a variant of this embodiment of the invention, the sensor 11 comprises a pair of electrodes 21,22.

In addition, in another variant, the sensor 11 further comprises a second pair of electrodes 23,24.

In one example of embodiment (FIG. 2) the sensor 11 is equipped with 4 electrodes 21, 22, 23, 24 preferably arranged at 90 degrees to each other, with the opposed pairs short-circuited.

Preferably, the electrodes are in stainless steel, of rounded form, and have a diameter of 5 mm.

The electrodes are preferably placed in direct contact with the liquid or semi-liquid foodstuff to be analysed. The electrical field generated by the sensor 11 has a non-null gradient (i.e. there is a region of minimum potential in the central zone of the sensor).

In this way the measured value of the electrical parameter P1 depends not only on the ions present in the sample, but also on the non-electrically charged particles.

The first detection apparatus 10 comprises electric generators 20 capable of generating an electrical test signal S suitable for being applied to the liquid or semi-liquid foodstuff 2.

The electrical test signal S is suitable for being applied to the foodstuff 2 by means of at least one of the pairs of electrodes 21,22 and 23,24.

The application of the electrical test signal S, according to the invention, makes it possible to determine a variation ΔP1 (FIG. 1) of the electrical parameter P1, characteristic of the liquid or semi-liquid foodstuff 2 to be treated;

According to the invention, the electrical parameter P1, characteristic of the liquid or semi-liquid foodstuff 2 to be recognized, comprises an electrical impedance Z.

In other words, according to the invention, the electrical parameter P1 is representative of an electrical conductivity of the liquid or semi-liquid foodstuff.

The variation ΔP1 of the electrical parameter P1 corresponds to a variation in modulus and/or phase of the electrical impedance Z.

According to the invention, the electrical test signal S generated by the electric generators 20 is a sinusoidal electrical test signal S1,S2.

Preferably the first sinusoidal electrical test signal S1 has a constant amplitude $A_0$ and variable frequency f1. In particular, the constant amplitude $A_0$ applicable to the signal can be comprised between 80 and 120 mV.

Even more particularly, in a preferred embodiment of the invention, the value of $A_0$ is 100 mV.

Preferably, the variable frequency f1 is such that 20 Hz<=f1<=10 KHz.

Preferably the second sinusoidal electrical test signal S2 is a signal with constant frequency $f_0$ and variable Amplitude A1.

In particular, the constant frequency $f_0$ applicable to the signal can be comprised between 10 and 20 Hz.

Even more particularly, in a preferred embodiment of the invention, the value of $f_0$ is 20 Hz;

Preferably, the variable amplitude A1 is such that 10 mV<=A1<=2V.

According to the invention, in an operation of recognizing a mix, the electric generators 20 can generate, exclusively, only one of the electrical test signals S1, S2.

In this case recognition occurs on the basis of the response of the system to only one of the test signals S1, S2.

Alternatively, the electric generators 20 can generate the signals S1, S2 in succession so that recognition occurs by combining the results obtained for the individual signals S1, S2.

The first detection apparatus 10, according to the first embodiment of the invention, comprises measuring devices 30 capable of calculating a value of the electrical parameter P1 starting from the variation ΔP1 determined by the application of the electrical test signal S.

In other words the measuring devices 30 are capable of calculating the value of the electrical parameter P1 starting from the variation ΔP1 determined by the application of at least one of the electrical test signals S1, S2 taken individually.

Alternatively, the value of the electrical parameter P1 is determined by the combined application of the electrical test signals S1 and S2.

According to both the embodiments of the invention, the ice-cream machine 1 comprises a control unit 50.

In accordance with the first embodiment of the invention, the control unit 50 is associated with the first detection apparatus 10.

In accordance with the second embodiment of the invention, the control unit 50 is associated with the second detection apparatus 110.

In general it should be noted that in the present context and in the claims which follow, the control unit 50 will be presented as divided into distinct functional modules (storage modules or operating modules), for the sole purpose of describing its functionalities clearly and completely.

In reality this control unit 50 can consist of a single electronic device, suitably programmed to perform the functions described, and the various modules can correspond to items of hardware and/or software routines forming part of the programmed device.

Alternatively or in addition, these functionalities can be performed by a plurality of electronic devices over which the above functional modules can be distributed.

The control unit can also make use of one or more μP processors (FIG. 1) for executing the instructions contained in the storage modules.

The above functional modules can, furthermore, be distributed over a plurality of local or remote calculators on the basis of the architecture of the network in which they reside.

According to the invention, the control unit 50 comprises a primary storage module 51, 151 (FIGS. 1, 1b, 11a, 11b), comprising in its turn identifiers Ii of the liquid or semi-liquid foodstuffs 2 and predetermined values of said electrical parameter P1 corresponding to said identifiers Ii.

Preferably, in the first embodiment of the invention, the first primary storage module 51 comprises furthermore identifying values of the electrical test signal S1, S2 such as for example voltage and frequency.

More specifically, in the first embodiment of the invention, the first primary storage module 51 comprises identifiers Ii of the liquid or semi-liquid foodstuffs 2 associated with corresponding predefined values of the electrical parameter P1.

In particular, according to the invention, the primary storage module 51 comprises a list of the liquid or semi-liquid foodstuffs that can be used by the machine to produce ice-cream and the corresponding impedance values Z calculated to correspond to predefined identifying values of the test signal S1,S2.

Preferably, the identifiers Ii consist of numerical values assigned to the various ice-cream mixes listed in the table above.

Alternatively, in the second embodiment of the invention, the second primary storage module 151 comprises identifiers Ii of the liquid or semi-liquid foodstuffs 2 associated with corresponding predefined values of RFID tags for the parameter P1.

According to the invention, the control unit 50 is configured to recognise the liquid or semi-liquid foodstuff 2, through a comparison between the detected value of the parameter P1, and predefined values of the electrical parameter P1 contained in the primary storage module 51,151.

In other words, in the first embodiment of the invention, the control unit 50 is configured to recognise the liquid or semi-liquid foodstuff 2, detected by the sensor 11, through a comparison between the detected value of the electrical parameter P1, in particular the value of the impedance Z, and the predefined values of the electrical parameter P1 contained in the first primary storage module 51.

The technical effect of recognition of an ice-cream mix through its impedance value is that the configurations for the subsequent operation of the machine can be established, without human margins of error.

In the case of ice-cream mixes, for example, it can be established whether the mix is fruit-based or milk-based; this distinction constitutes the first fundamental division for the configuration of the machine.

The two categories can then be further subdivided on the basis of the percentage of fats and the added ingredients.

In the second embodiment of the invention, the control unit 50 is configured to recognise the liquid or semi-liquid foodstuff 2, detected by the second detection apparatus 110, through a comparison between the detected value of the parameter P1, in particular an RFID tag reader, and the predefined values of RFID tags contained in the second primary storage module 151.

In both embodiments of the invention, the control unit 50 is configured, consequently, to set operating parameters P2 (FIGS. 11b, 12b) for the machine 1, 1b depending on the liquid or semi-liquid foodstuff 2 recognized.

Preferably, the operating parameters P2 comprise a mixing temperature for the liquid or semi-liquid foodstuff 2 recognized.

Preferably, the operating parameters P2 comprise a speed of mixing for the liquid or semi-liquid foodstuff 2 recognized.

Preferably, the operating parameters P2 comprise a duration of mixing for the liquid or semi-liquid foodstuff 2 recognized.

In other words, the operating parameters P2 comprise one or more of temperature, speed and mixing duration for the treatment of said liquid or semi-liquid foodstuff 2 recognized.

According to the invention, the control unit 50 comprises a secondary storage module 52, 152 comprising in its turn identifiers Ii of said liquid or semi-liquid foodstuffs 2 and predefined values of the operating parameters P2 corresponding to said identifiers Ii (FIGS. 11b, 12b).

Preferably, in the first embodiment of the invention, the first secondary storage module 52 (FIG. 11b) comprises furthermore identifying values of the electrical test signal S1, S2 such as for example voltage and frequency.

On the basis of the values of the operating parameters P2 corresponding to the mix recognized, the ice-cream machine 1, 1b can vary the thermal power delivered by said compressor 7 and/or the rotation speed of a stirrer for the liquid or semi-liquid foodstuff 2.

In other words, the control unit 50 is configured for setting the operating parameters P2 of the machine 1, 1b depending on the liquid or semi-liquid foodstuff 2 recognized, so as to vary one or more among the thermal power delivered by the compressor 7 and the rotation speed of a stirrer, suitable for operating in the holding tank 3, for mixing the liquid or semi-liquid foodstuff 2.

From the description given, the general operation of ice-cream machine of the invention may be deduced.

The liquid or semi-liquid foodstuff may be recognized before or after loading into the churning cylinder.

In the event that it must be recognized before, the control unit activates the RFID tag reading apparatus which carries out detection of the product.

In the event that it must be recognized after, i.e. once the liquid or semi-liquid foodstuff is "loaded" into the machine, for example into a processing tank or into the churning cylinder, the control unit activates the sensor which carries out detection of the product.

In both cases, when recognition is completed, the control unit compares the data detected with predefined data and identifies the product.

On the basis of the product identified, the control unit configures a table for programming the operating parameters of the machine necessary for the subsequent stages of processing the specific mix recognized.

There now follows a description of experiments carried out on the ice-cream machine of the first embodiment of the invention.

The analysis of the type of mix, as previously described, can be performed by various methods.

The results of the analysis, although substantially similar, present variations due both to the instruments used (number of electrodes used), and to the temperature of detection (4° C. or 35° C.), and to the electrical characteristics of the test signals (constant or variable power factors).

The results are further evaluated both in relation to the individual test (test with single temperature and/or single variable power factor and/or single configuration of the electrodes) and in relation to a combination of tests (tests with variable temperatures and/or with different variable power factors and/or different configurations of the electrodes).

In the groups of FIGS. 4 to 6, the analysis of the type of mix was performed with measurements of the impedance Z (modulus and phase) obtained by application of a signal with fixed amplitude (V=100 mV sinusoidal) and variable frequency (20 Hz<=f1<=10 KHz).

The fruit-based mixes are represented by empty bars, while cream-based mixes are represented by solid bars.

The numerical identifiers in the associated panel below the charts identify the ice-cream mixes with the numerical values Ii in the table shown previously.

FIGS. 4a, 4b, 4c use a bar chart to represent the values of the modulus of the impedance |Z| detected by means of a sensor with two electrodes at a temperature of the liquid or semi-liquid foodstuff of 4° C.

The values of the modulus of the impedance |Z| relate to measurements taken at frequencies of 20 Hz (FIG. 4a) and 200 Hz (FIG. 4b), while the values of the phase of the impedance, Arg(Z) (FIG. 4c), are obtained at a frequency of 20 Hz.

From the test we deduce that, in general, cream-based mixes are characterised by a value for the modulus of the impedance |Z| and for the phase of the impedance arg(Z) substantially lower than the corresponding values for fruit-based mixes.

FIGS. 5a, 5b, 5c, 6a, 6b, 6c represent the values of the impedance Z detected using a sensor with four electrodes.

For the set of mixes considered, the following parameters were monitored:

the percentage variation in the impedance Z at a frequency of 20 KHz whose expression is defined as $$\Delta|Z|_{20Hz} \% = \frac{|Z|_{20Hz} - |Z|_{10KHz}}{|Z|_{20Hz}} * 100;$$

(FIGS. 5a and 6a)

the percentage variation in the impedance Z at a frequency of 10 KHz whose expression is defined as $$\Delta|Z|_{10KHz} \% = \frac{|Z|_{20Hz} - |Z|_{10KHz}}{|Z|_{10KHz}} * 100;$$

(FIGS. 5b and 6b)

Figure 6C:
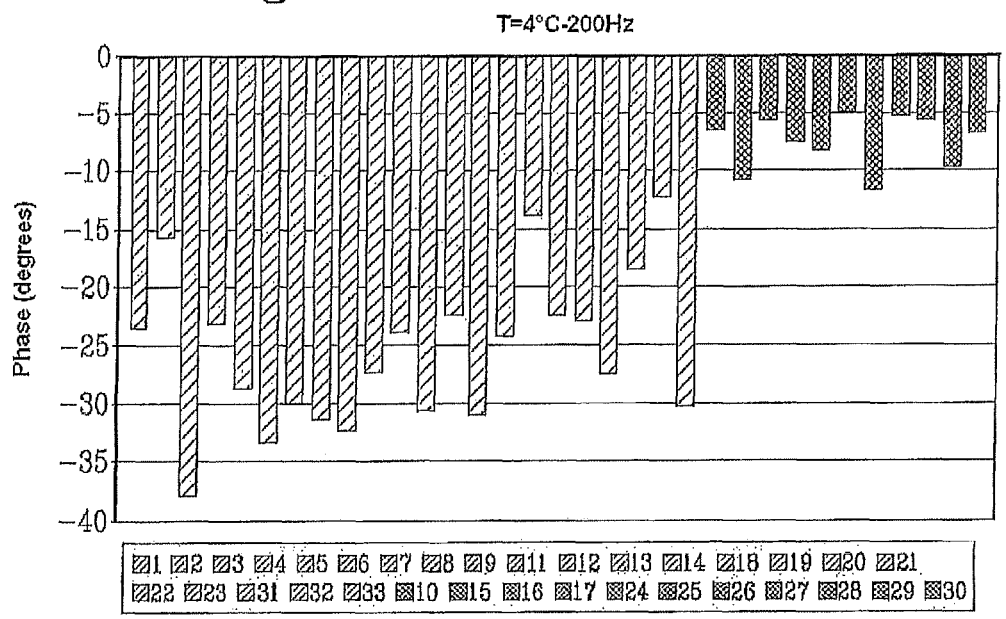

Arg(Z) at a frequency of 200 Hz. (FIGS. 5c and 6c)

The tests were carried out at temperatures of 4° C. (FIGS. 5a, 5b, 5c) and 35° C. (FIGS. 6a, 6b, 6c).

From the tests we deduce that, in general, at both temperatures fruit-based mixes are substantially distinguishable from cream-based mixes and the impedance values (modulus and phase) make it substantially possible to recognise the mix treated.

In the groups of FIGS. 7 and 8, the analysis of the type of mix was performed with measurements of the impedance Z (modulus and phase) obtained by application of a signal with variable amplitude (10 mV<=A1<=2V) and fixed frequency (20 Hz).

In other words, as an alternative to the measurements of impedance discussed earlier, it is possible to carry out another type of measurement in which the frequency of the applied sinusoidal signal is kept fixed while the amplitude of this signal is varied.

The principle on which these measurements are based is that the relationship between voltage and current in a system composed of a pair of electrodes immersed in a sample liquid may be considered linear only as long as the applied signal is kept sufficiently small (in practice the non-linear voltage-current relationship can be approximated with only the linear term in the expanded Taylor series).

As the amplitude of the applied signal increases, the impedance Z begins to deviate from the behaviour for small signals, and by evaluating the size of this variation we can deduce information on the nature of the sample under examination.

Figure 7A:
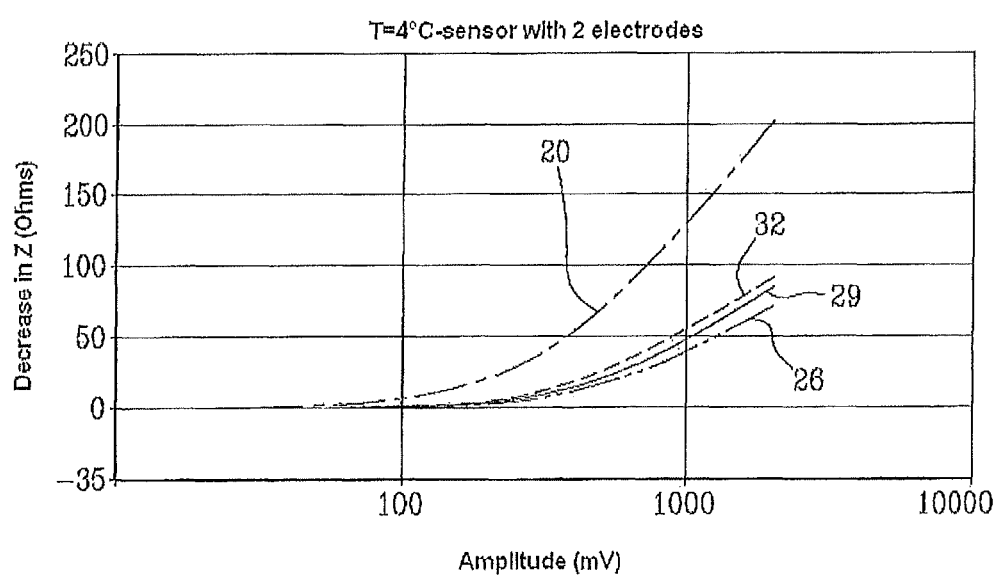
Figure 7B:
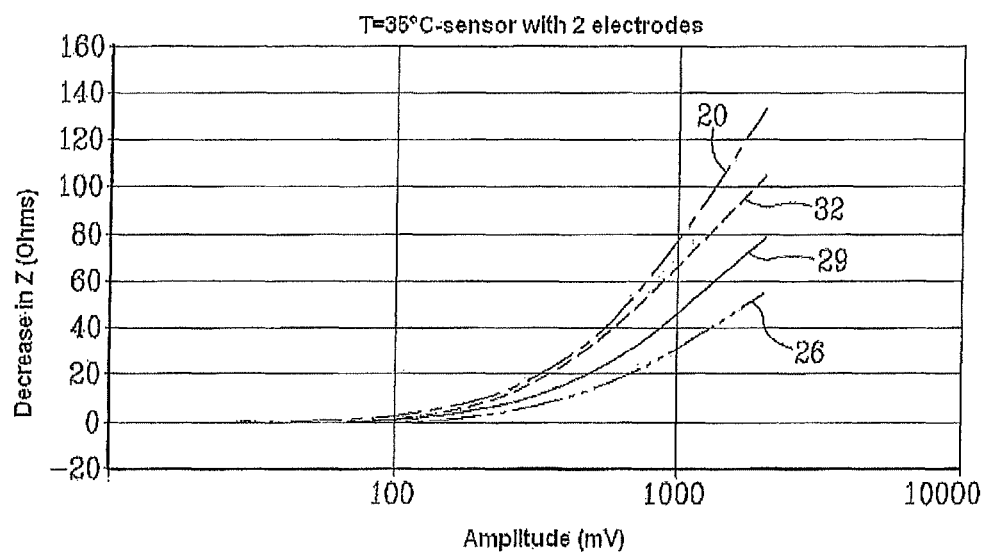

FIGS. 7a,7b represent the values of the modulus of the modulus of the impedance |Z| measured by means of a sensor with two electrodes.

Figure 8A:
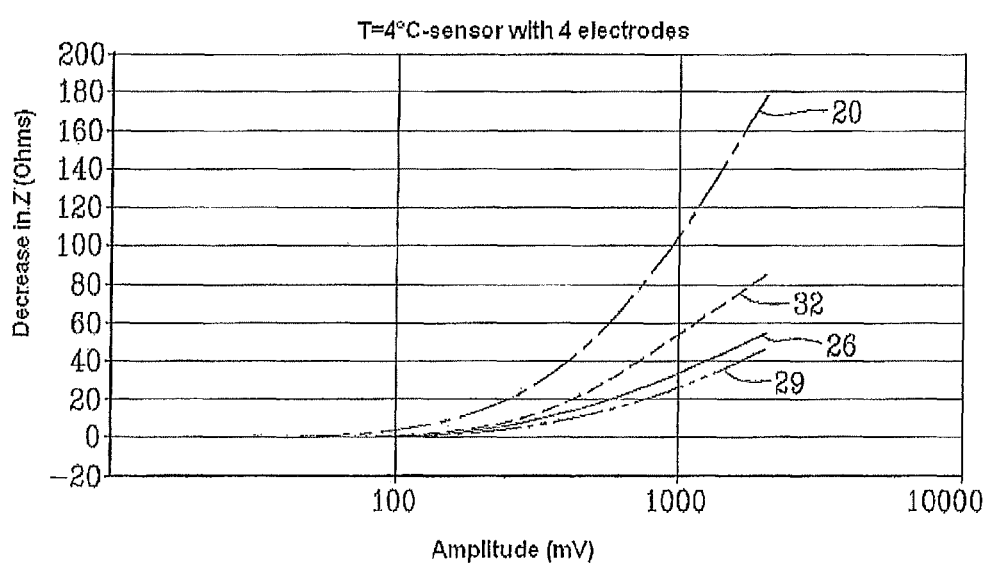
Figure 8B:
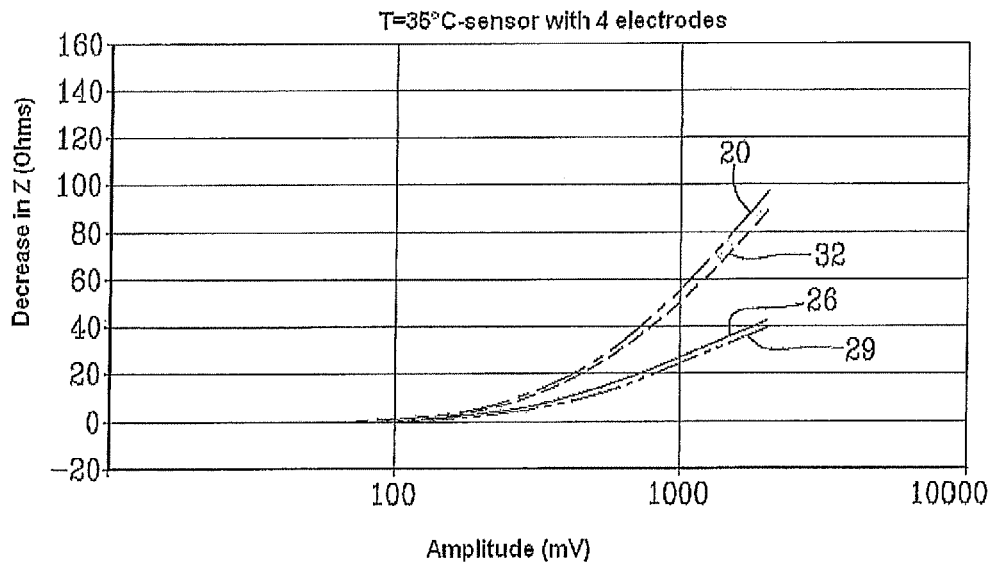
Figure 9A:
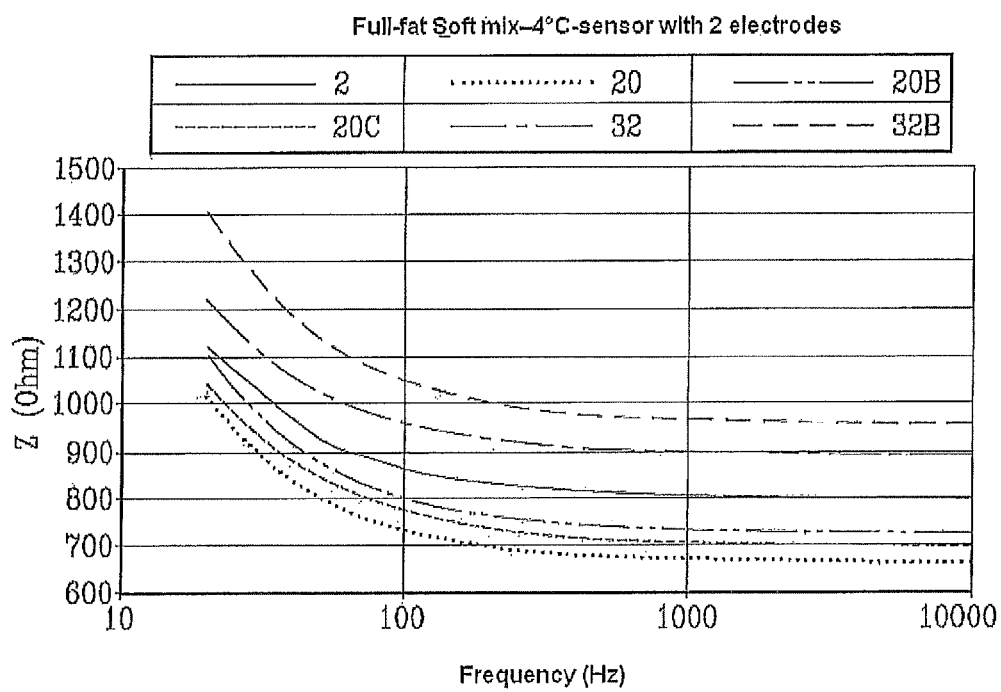
Figure 9B:
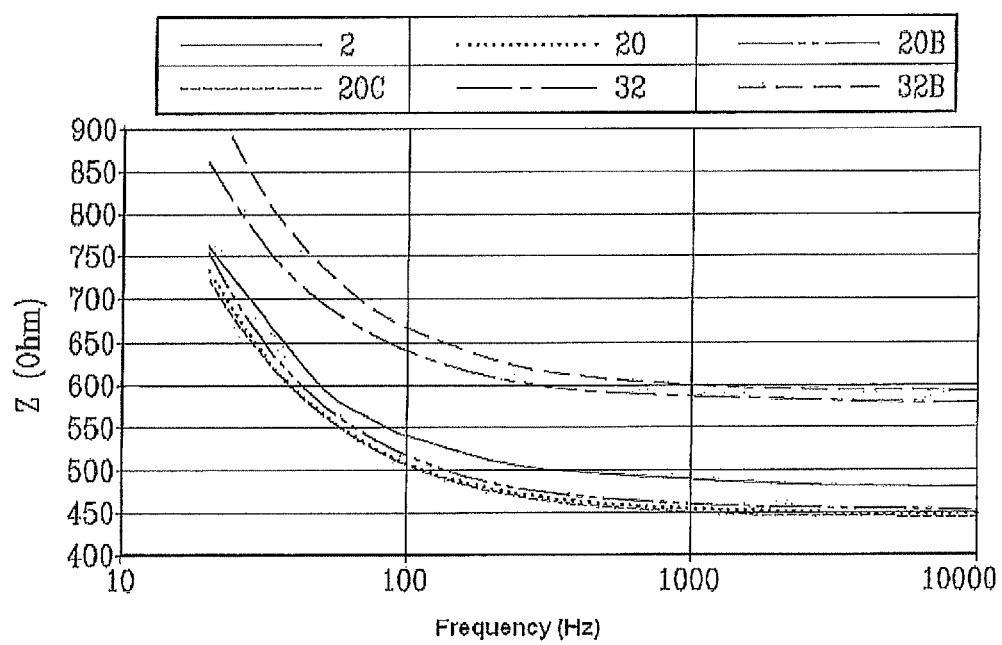
Figure 9C:
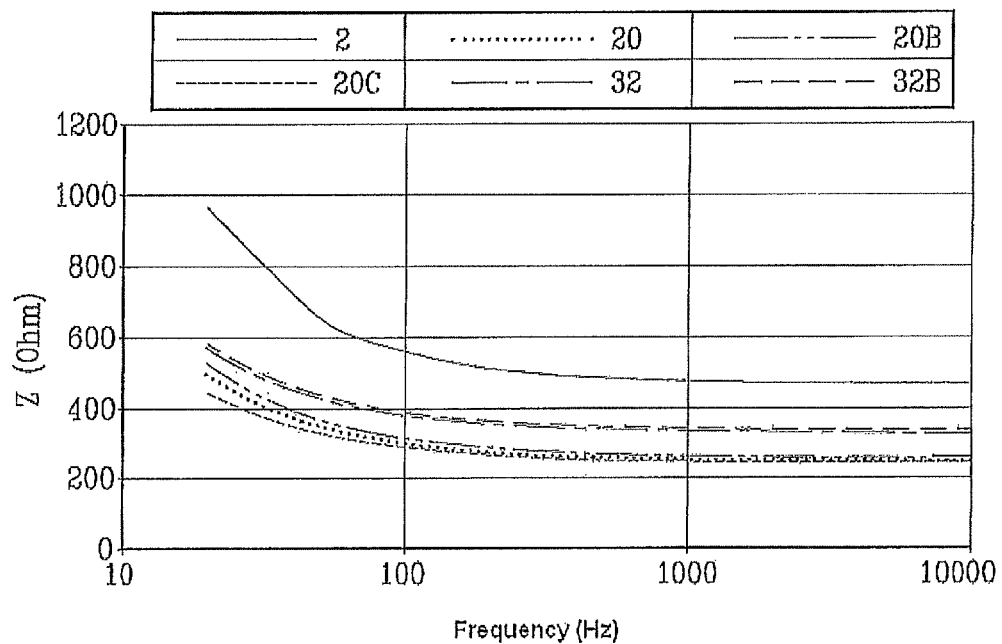
Figure 9D:
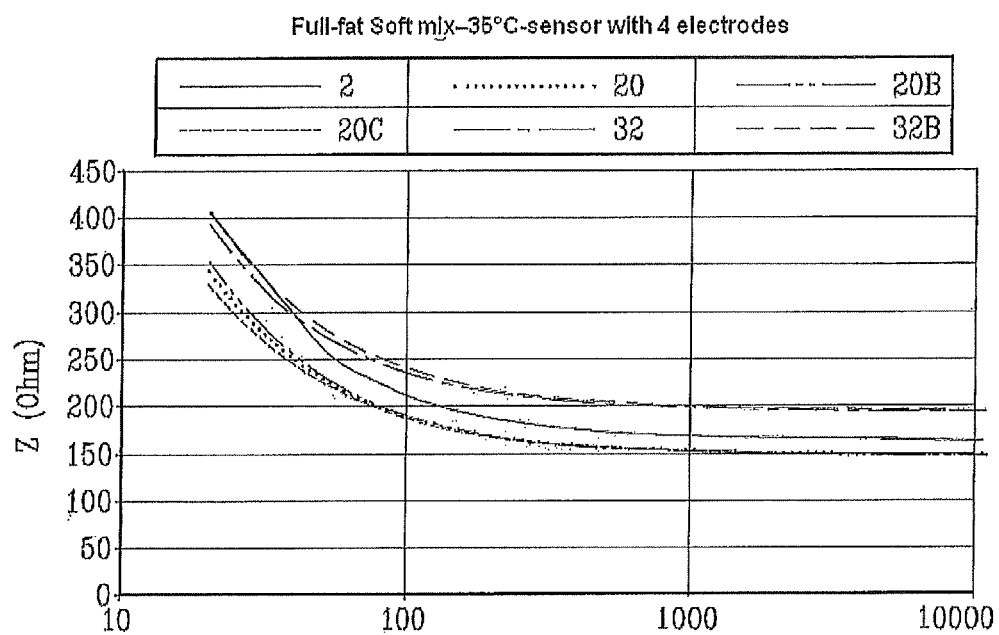

FIGS. 8a,8b represent the values of the modulus of the modulus of the impedance |Z| measured by means of a sensor with four electrodes.

The behaviours of the modulus of the impedance |Z| are evaluated for the frequency 20 Hz and amplitude of the sinusoidal signal comprised between 10 mV and 2 V for both the sensors and for both the temperatures 4° C. and 35° C.

The measurements were carried out on a subset of the bases described in the above table comprising the most conductive fruit bases (banana, Ii=26; kibana, Ii=29) and the full-fat soft mix of which samples were monitored of mix 20 in the case of pasteurisation at 65° C. and mix 32 in the case of pasteurisation at 85° C.

The results obtained indicate the possibility of distinguishing the fruit bases from the cream bases in particular in the case of use of the 4-electrode sensor at a temperature of 35° C.

To obtain more significant results, the measurement at fixed frequency and variable amplitude preferably uses signals at low frequency (20 Hz) and high amplitude (2V).

Since this induces instability at the electrode-mix interface which entails a reduction in the modulus of the impedance |Z| measured immediately after a measurement of this type, the measurement must therefore be made very quickly and with an adequate lapse of time between successive measurements.

Other parameters to be evaluated, both in the case of variable-frequency measurements (as described in relation to the groups of FIGS. 4 to 6), and at constant frequency (as described in relation to the groups of FIGS. 7 to 10) are the sensitivity of the measurements of impedance to the process of pasteurisation, and to what extent the measurements can be repeated without there being perceptible variation (repeatability of measurements).

In order to evaluate the repeatability of the measurements first described, various samples of low-fat soft mixes (indicated in the table with Ii=1 and Ii=31) and full-fat soft mixes (indicated in the table with Ii=2, Ii=20 and Ii=32) were analysed in successive tests, with intervals of at least a day between two consecutive tests.

In order to assess whether the procedure for preparing the mixes has an influence on the data obtained, each of the two mixes was prepared in two versions (with a low pasteurisation at 65° C. and a high pasteurisation at 85° C.). Successive measurements on the same batch of mixes are indicated by adding a suffix letter (B, C, etc.) to the number characterising the mix.

Below is an account of the behaviour of |Z| for frequencies comprised between 20 Hz and 10 KHz, and amplitude of signal of 100 mV for the mix "Fat soft", for the temperatures 4° C. (FIGS. 9a and 9c) and 35° C. (FIGS. 9b and 9d) for both types of sensor.

The fat soft mix (Ii=2) was prepared with a high pasteurisation cycle at 85° C., the full-fat soft mix (Ii=20) with a pasteurisation cycle at 65° C. and the full-fat soft mix (Ii=32) with a pasteurisation cycle at 85° C. obtained by switching the heater on and off, so as not to exceed too greatly the temperature of 85° C.

The mix pasteurised at 85° C. is distinguishable to the naked eye from the one pasteurised at 65° C. by being much more dense.

Figure 10A:
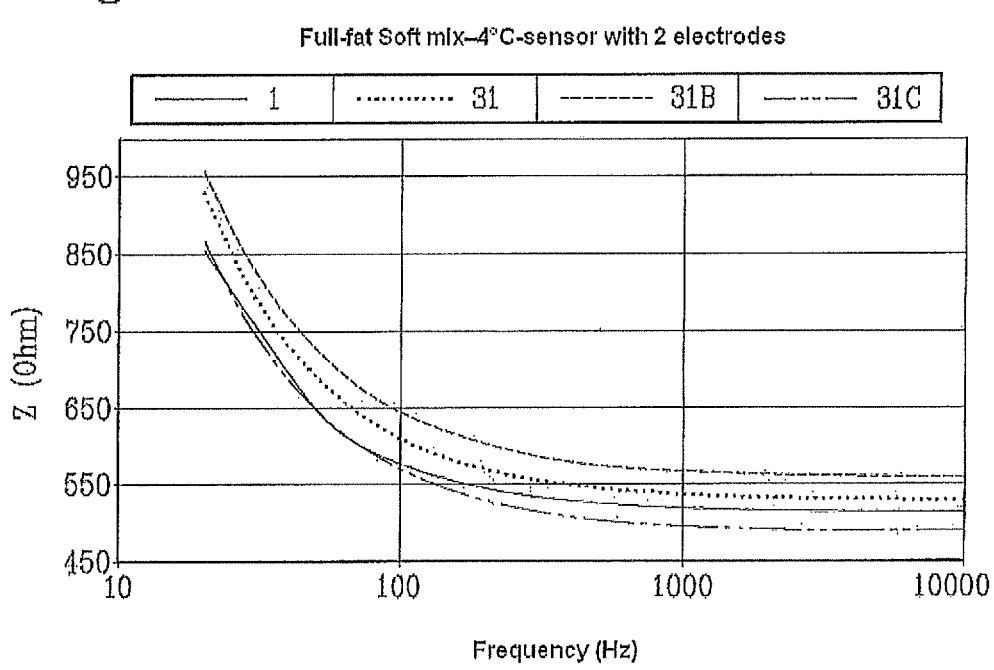
Figure 10B:
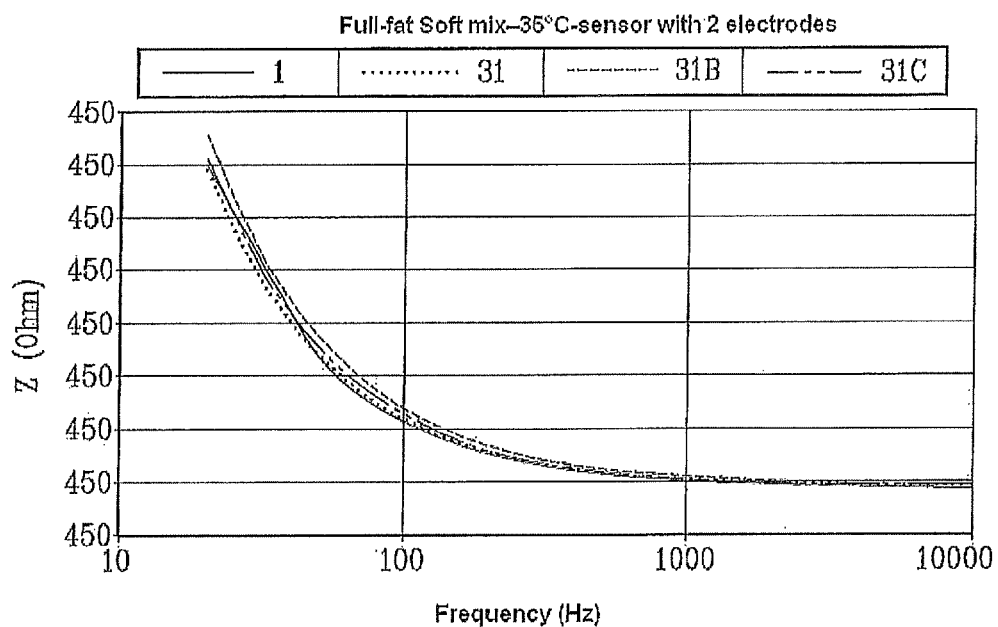
Figure 10C:
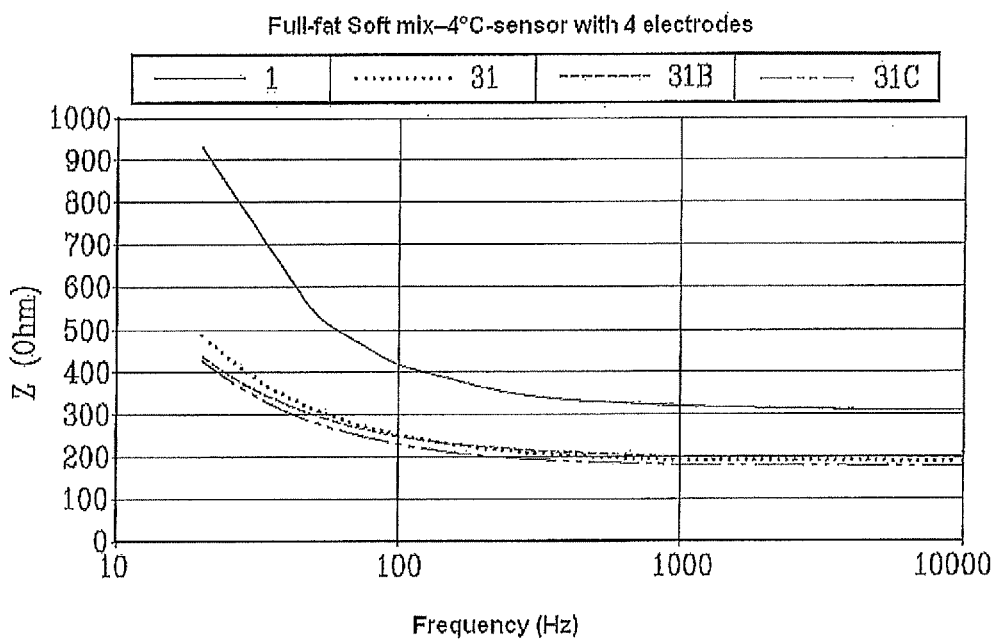
Figure 10D:
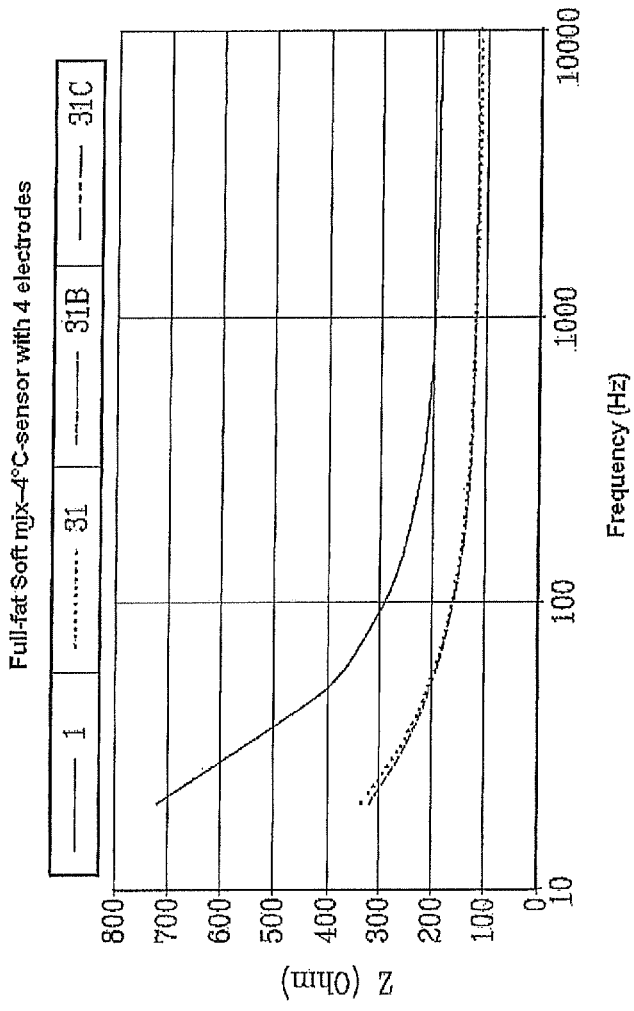

The similar graphs are reproduced below for the cases of "Low-fat soft" mix at 4° C. (FIGS. 10a and 10c) and at 35° C. (FIGS. 10b and 10d).

The low-fat soft mix (Ii=1) was obtained with a high pasteurisation cycle at 85° C. and a maturation time of 13 hours while the Low-fat soft mix (Ii=31) underwent a low pasteurisation cycle at 65° C.

To the naked eye there are no substantial differences between the two types of mix in terms of colour, density etc.

The measurements carried out on the same mix in general showed a relative percentage error lower at high frequency than at low frequencies: this is probably due to the phenomenon of polarisation of the electrode which occurs at low frequencies.

Even in the case of measurements made at constant frequency and variable amplitude, however, the relative error does not seem to prejudice the reliability of distinguishing between full-fat soft base and more conductive fruit bases.

For a given mix examined, the frequency measurement of the sample is found to be dependent on the process of preparation and in particular on the temperature and time of pasteurisation.

With the 4-electrode sensor it is possible to distinguish the type of pasteurisation carried out, both for the full-fat soft mix and for the low-fat soft mix with a degree of accuracy superior to that of the 2-electrode sensor.

This shows the possibility of investigating the organoleptic characteristics of the mixes from an electrical point of view, and in particular how the pasteurisation process alters the characteristics of the medium and therefore up to what point it is possible to pasteurise the mix without consistently altering it.

The invention claimed is:

1. An ice-cream machine for converting a liquid or semi-liquid foodstuff, comprising:
   a holding tank for said foodstuff, the holding tank being a churning cylinder;
   a heat transfer circuit for at least one chosen from cooling and heating said foodstuff, comprising a compressor adapted to vary a thermal power of the heat transfer circuit;
   a stirrer positioned in the churning cylinder for churning the foodstuff into ice cream;
   a detection apparatus adapted to generate a parameter characteristic of said foodstuff, wherein the parameter is an electric impedance of the foodstuff; wherein the detection apparatus comprises:
      an electric generator for generating an electric test signal to be applied to said foodstuff for determining a variation value of the electric impedance of the foodstuff;
      a sensor configured for detecting said variation value of the electric impedance of the foodstuff;
      a measurement device connected to the sensor and configured for generating a value of the electric impedance parameter of the foodstuff from the variation value of the electric impedance of the foodstuff, wherein the variation value of the electric impedance of the foodstuff is determined by a variation in both a modulus and a phase of the electric impedance of the foodstuff;

a control unit associated with said detection apparatus, comprising:
  a primary storage module comprising identifiers of said foodstuff and predetermined values of identification parameters corresponding to said identifiers,
  wherein said control unit is configured for:
  recognising the foodstuff by associating the generated electric impedance parameter with one of the predetermined values of the identification parameter contained in said primary storage module and thereby determining that the foodstuff is either fruit based or cream based;
  setting operating parameters of at least one actuator of said machine as a function of said recognized foodstuff;
  wherein the electric generator is configured to generate the electric test signal to include a first electric signal and a separate second electric signal in succession so that the recognising the foodstuff occurs by combining results obtained for the individual first electric and second electric signals; wherein the first electric signal has a constant amplitude and a variable frequency and the second electric signal has a variable amplitude and a constant frequency.

2. The ice-cream machine as claimed in claim 1, wherein said sensor comprises at least one pair of electrodes adapted to contact said foodstuff, and said electric test signal is adapted to be applied to said foodstuff through said at least one pair of electrodes.

3. The ice-cream machine as claimed in claim 1, wherein said operating parameters comprise one or more of temperature, speed, mixing duration for treatment of said foodstuff.

4. The ice-cream machine as claimed in claim 1, wherein said control unit comprises a secondary storage module in turn comprising identifiers of a plurality of various liquid or semi-liquid foodstuffs and predetermined values of said operating parameters corresponding to said identifiers.

5. The ice-cream machine as claimed in claim 1, wherein the at least one actuator includes the compressor and the stirrer and the operating parameters being set as a function of the recognized foodstuff include both:
  thermal power supplied by said compressor; and
  rotation speed of the stirrer.

6. The ice-cream machine as claimed in claim 1, wherein said sensor comprises a first pair of electrodes.

7. The ice-cream machine as claimed in claim 6, wherein said sensor comprises a second pair of electrodes.

8. The ice-cream machine as claimed in claim 1, wherein the first electric signal is a sinusoidal signal of constant amplitude $A_0$ and variable frequency $f1$.

9. The ice-cream making machine as claimed in claim 8, wherein said variable frequency $f1$ is of such a nature that 20 Hz$<=f1<=$10 KHz and said constant amplitude $A_0$ is 100 mV.

10. The ice-cream making machine as claimed in claim 1, wherein the second electric signal is a sinusoidal signal of constant frequency $f_0$ and variable amplitude $A1$.

11. The ice-cream making machine as claimed in claim 10, wherein said variable amplitude $A1$ is of such a nature that 10 mV$<=A1<=$2V and said constant frequency $f_0$ is 20 Hz.

12. The ice-cream machine as claimed in claim 1, wherein both the first electric signal and the second electric signal are sinusoidal signals.

* * * * *